(12) United States Patent
Chen et al.

(10) Patent No.: US 8,537,542 B2
(45) Date of Patent: Sep. 17, 2013

(54) ELECTRONIC DEVICE

(75) Inventors: Juo-Ti Chen, Taipei (TW); Yung-Hui Chen, Taipei (TW); Kuo-Nan Ling, Taipei (TW); Po-An Lin, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 13/339,374

(22) Filed: Dec. 29, 2011

(65) Prior Publication Data

US 2012/0170190 A1    Jul. 5, 2012

Related U.S. Application Data

(60) Provisional application No. 61/429,191, filed on Jan. 3, 2011.

(51) Int. Cl.
*G06F 1/16* (2006.01)
*G06F 3/02* (2006.01)
*H04M 1/00* (2006.01)

(52) U.S. Cl.
USPC ............. 361/679.55; 361/679.56; 455/575.1; 455/575.4; 345/168; 345/169; 345/905

(58) Field of Classification Search
USPC ............. 361/679.01–679.45, 679.55–679.59; 455/575.1, 575.3, 575.4; 345/156, 157, 168, 345/169, 905

See application file for complete search history.

(56) References Cited

U.S. PATENT DOCUMENTS

| | | | | |
|---|---|---|---|---|
| 7,448,872 | B2 * | 11/2008 | Im | 439/10 |
| 7,716,786 | B2 * | 5/2010 | Shen | 16/239 |
| 8,199,475 | B2 * | 6/2012 | Yeh et al. | 361/679.27 |
| 8,213,163 | B2 * | 7/2012 | Wu et al. | 361/679.01 |
| 8,248,789 | B2 * | 8/2012 | Wu et al. | 361/679.56 |
| 2008/0304215 | A1 * | 12/2008 | Chiu | 361/681 |
| 2009/0286573 | A1 * | 11/2009 | Jang et al. | 455/566 |
| 2010/0118487 | A1 * | 5/2010 | Ou et al. | 361/679.55 |

* cited by examiner

*Primary Examiner* — Jayprakash N Gandhi
*Assistant Examiner* — Nidhi Desai
(74) *Attorney, Agent, or Firm* — Jianq Chyun IP Office

(57) ABSTRACT

An electronic device including a first housing, a second housing and a pivot structure is provided. The pivot structure includes a pivot shaft, a sliding component and a supporting component. The pivot shaft is pivoted on the first housing. The sliding component is disposed on the second housing. One end of the sliding component sleeves the pivot shaft, such that the second housing rotates relative to the first housing. The supporting component has a first end and a second end. The first end is pivoted to the first housing. When the second housing rotates relative to the first housing, the supporting component provides a supporting force to the second housing.

8 Claims, 9 Drawing Sheets

ELECTRONIC DEVICE

CROSS-REFERENCE TO RELATED APPLICATION

This application claims the priority benefits of U.S. provisional application Ser. No. 61/429,191, filed on Jan. 3, 2011. The entirety of the above-mentioned patent applications is hereby incorporated by reference herein and made a part of this specification.

BACKGROUND OF THE INVENTION

1. Field of the Invention

The invention relates to an electronic device. Particularly, the invention relates to an electronic device having a pivot structure.

2. Description of Related Art

Along with development of information technology, it is more and more easy to obtain required information from electronic devices in daily life. On the other hand, with improvement of industrial engineering, various electronic devices have a general trend of lightness, slimness, shortness and smallness, and since the electronic devices have a feature and advantage of portability, they are widely used in people's daily life.

Taking mobile phones as an example, to meet a requirement of portability and different preferences and demands, besides a conventional bar-type mobile phone, the mobile phones further include clamshell mobile phones, swivel mobile phones, and slide mobile phones, etc. Taking the slide mobile phone as an example, an upper body thereof is stacked over and can be slid relative to a lower body thereof, so as to present different operation modes of open and close. Stacking of the two bodies avails reducing a whole size of the mobile phone, and the two bodies can be spread during a specific operation mode. For example, in some slide mobile phones, besides the upper body and the lower body can slide relative to each other, the upper body can also be tilted to the lower body to facilitate the user viewing a display screen on the upper body. Moreover, with progress of touch display technology, a touch display function of the mobile phone gradually replaces a conventional keyboard function, and a user can perform a touch operation through the display screen. However, when the user performs the touch operation on the upper body tilted to the lower body, the upper body probably sways due to user's press, which causes utilization inconvenience.

SUMMARY OF THE INVENTION

The invention is directed to an electronic device, which has a stable structure to avoid swaying a device body during a touch operation.

The invention provides an electronic device including a first housing, a second housing and a pivot structure. The pivot structure includes a pivot shaft, a sliding component and a supporting component. The pivot shaft is pivoted to the first housing. The sliding component is disposed on the second housing. One end of the sliding component sleeves the pivot shaft, such that the second housing is suitable for rotating relative to the first housing. The supporting component has a first end and a second end. The first end is pivoted to the first housing. When the second housing rotates relative to the first housing, the supporting component provides a supporting force to the second housing.

In an embodiment of the invention, the second housing has a sliding portion, and the second housing is slidably connected to the sliding component through the sliding portion.

In an embodiment of the invention, the second housing slides relative to the first housing between a stacked position and an expanded position.

In an embodiment of the invention, only when the second housing is in the expanded position relative to the first housing, the second housing is capable of rotating to a tilt position relative to the first housing.

In an embodiment of the invention, the second end of the supporting component is slidably disposed on the sliding component, the sliding component has an elastic stopper, and the second end and the elastic stopper are interfered for positioning the second end.

In an embodiment of the invention, the first housing has a slot, the first end of the supporting component is pivoted to the slot, and the supporting component is limited by the second housing and is contained in the slot.

In an embodiment of the invention, the pivot structure further includes an elastic component, and the elastic component is connected to the first housing and the first end of the supporting component.

In an embodiment of the invention, the first housing has a position limiting component, the second housing has a position limiting portion, and when the second housing is rotated to stack on the first housing, the position limiting component and the position limiting portion are interfered.

In an embodiment of the invention, a width of the second housing is smaller than a width of the first housing.

According to the above descriptions, the pivot structure of the invention has the supporting component pivoted to the first housing, and after the second housing rotates relative to the first housing, the supporting component can stably support the second housing. In this way, when a user presses the second housing to perform a touch operation, swaying of the second housing is mitigated due to the support of the supporting component, so that the electronic device has a better operability.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
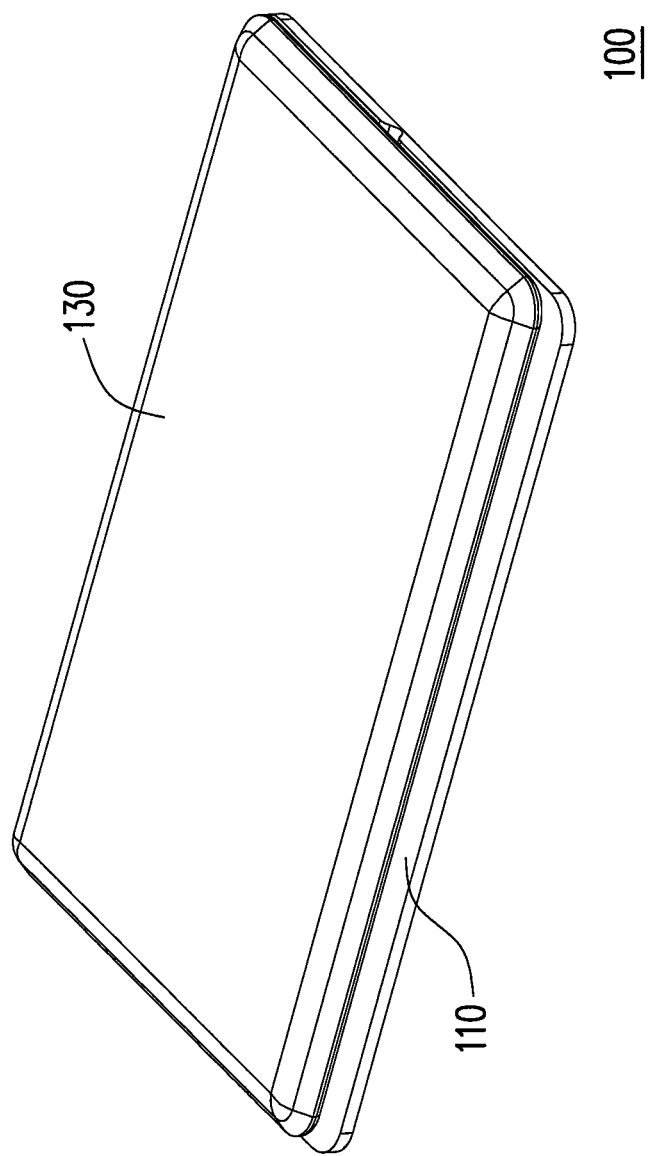
FIG. 1A to FIG. 1C illustrate a motion flow of an electronic device according to an embodiment of the invention.
Figure 1B:
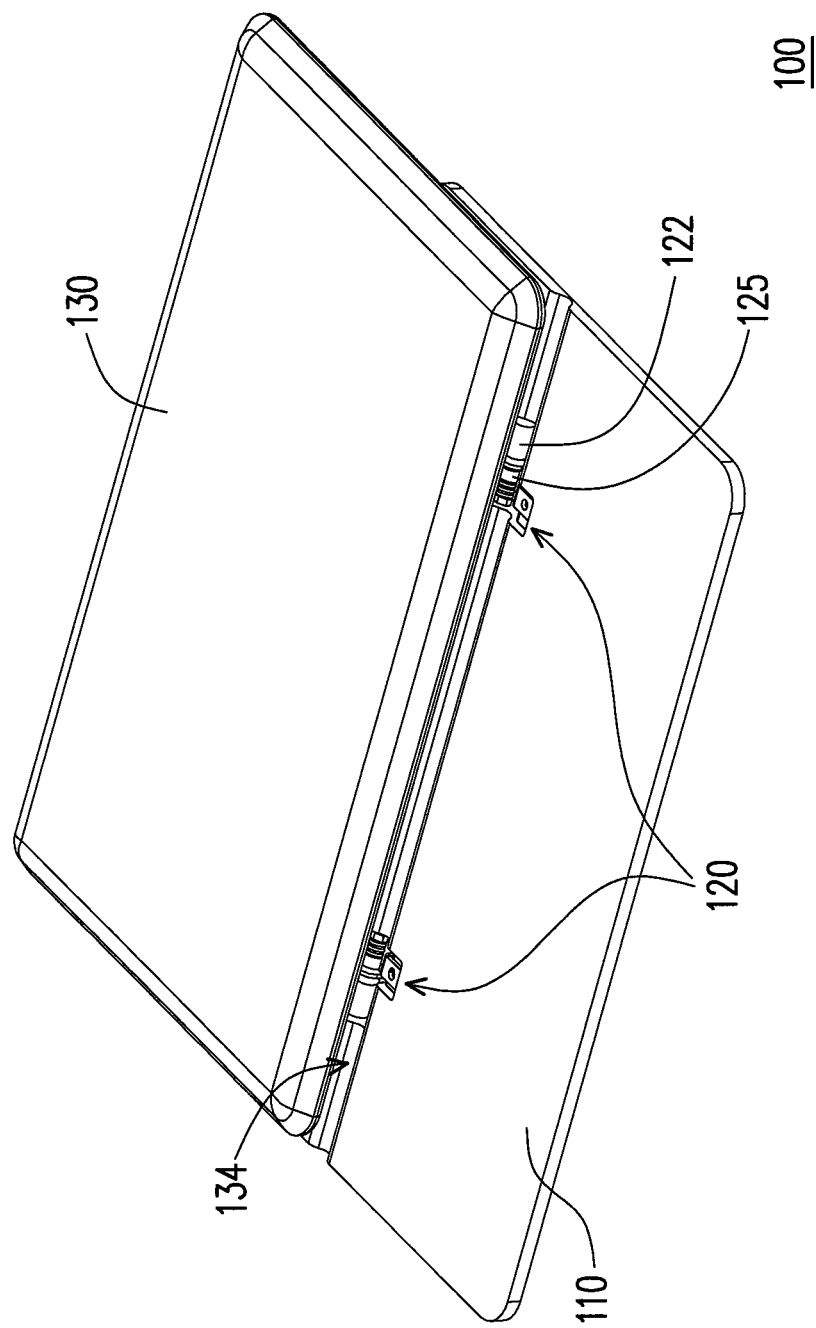
Figure 1C:
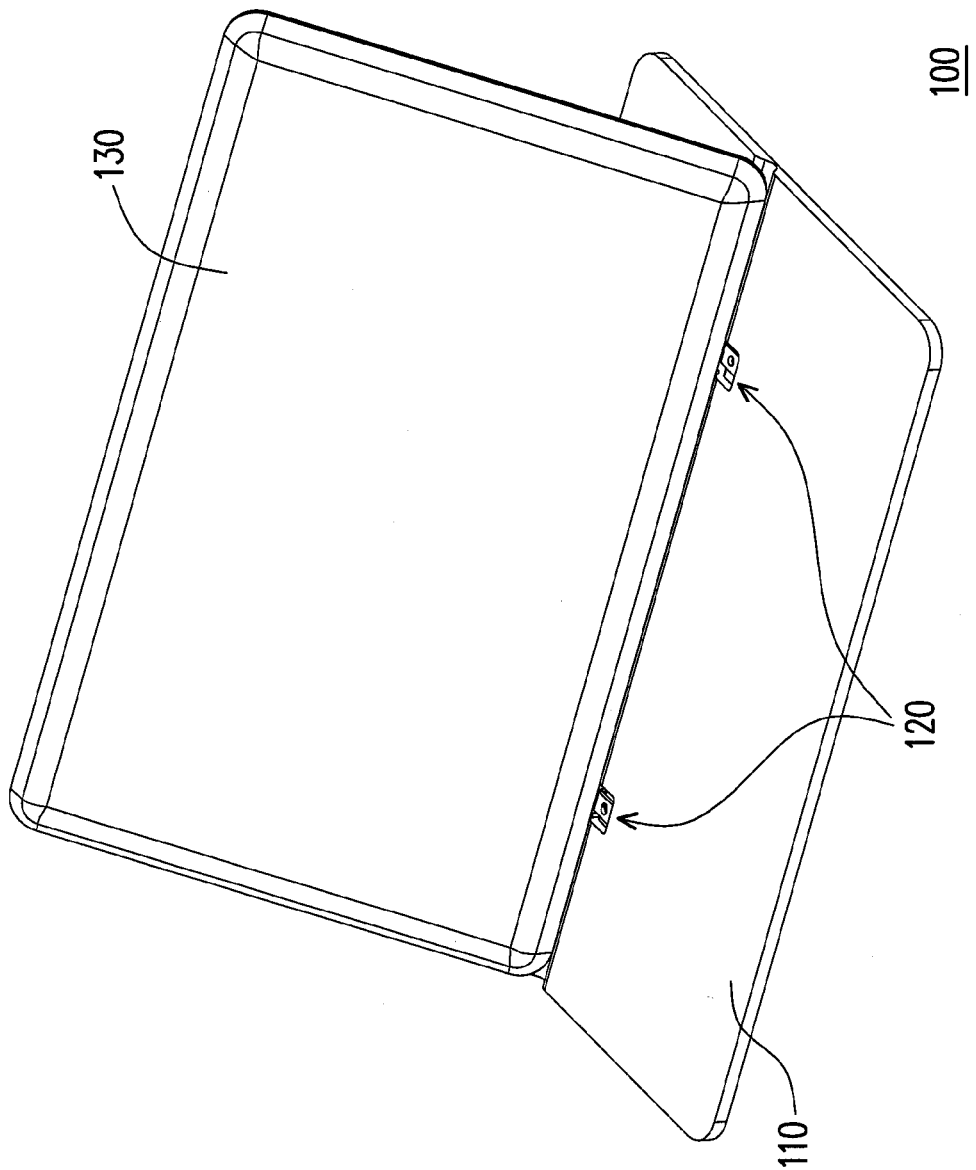
Figure 2A:
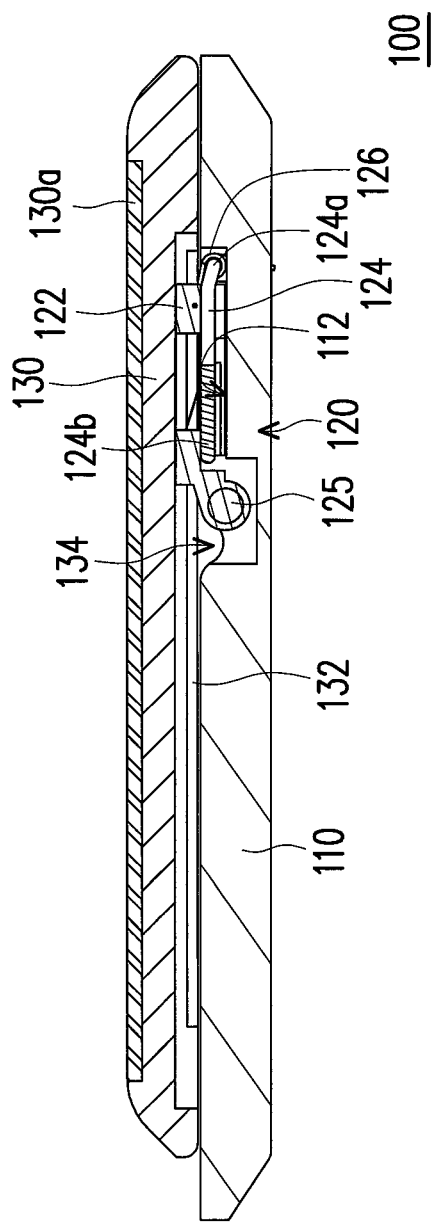
FIG. 2A to FIG. 2C are respectively cross-sectional views of FIG. 1A to FIG. 1C.
Figure 2B:
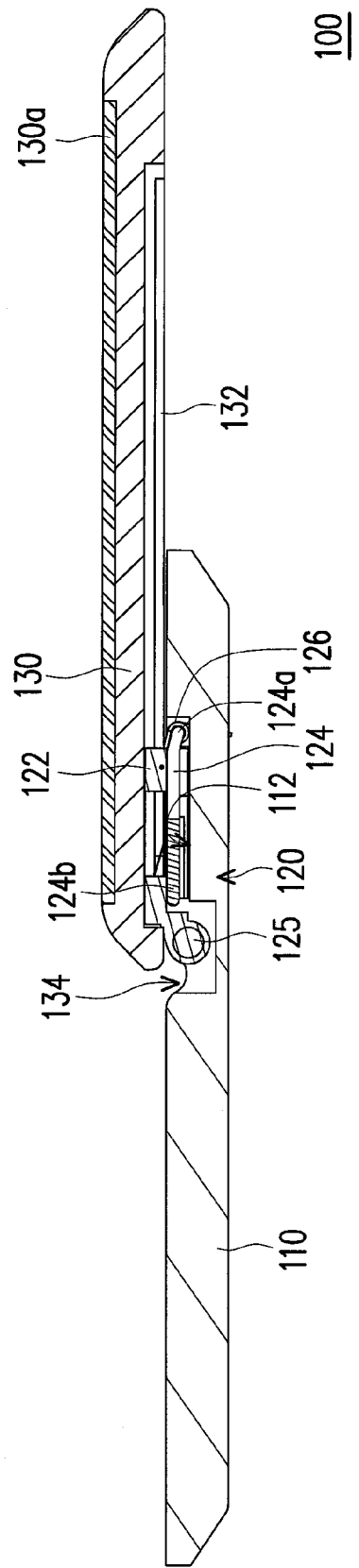
Figure 2C:
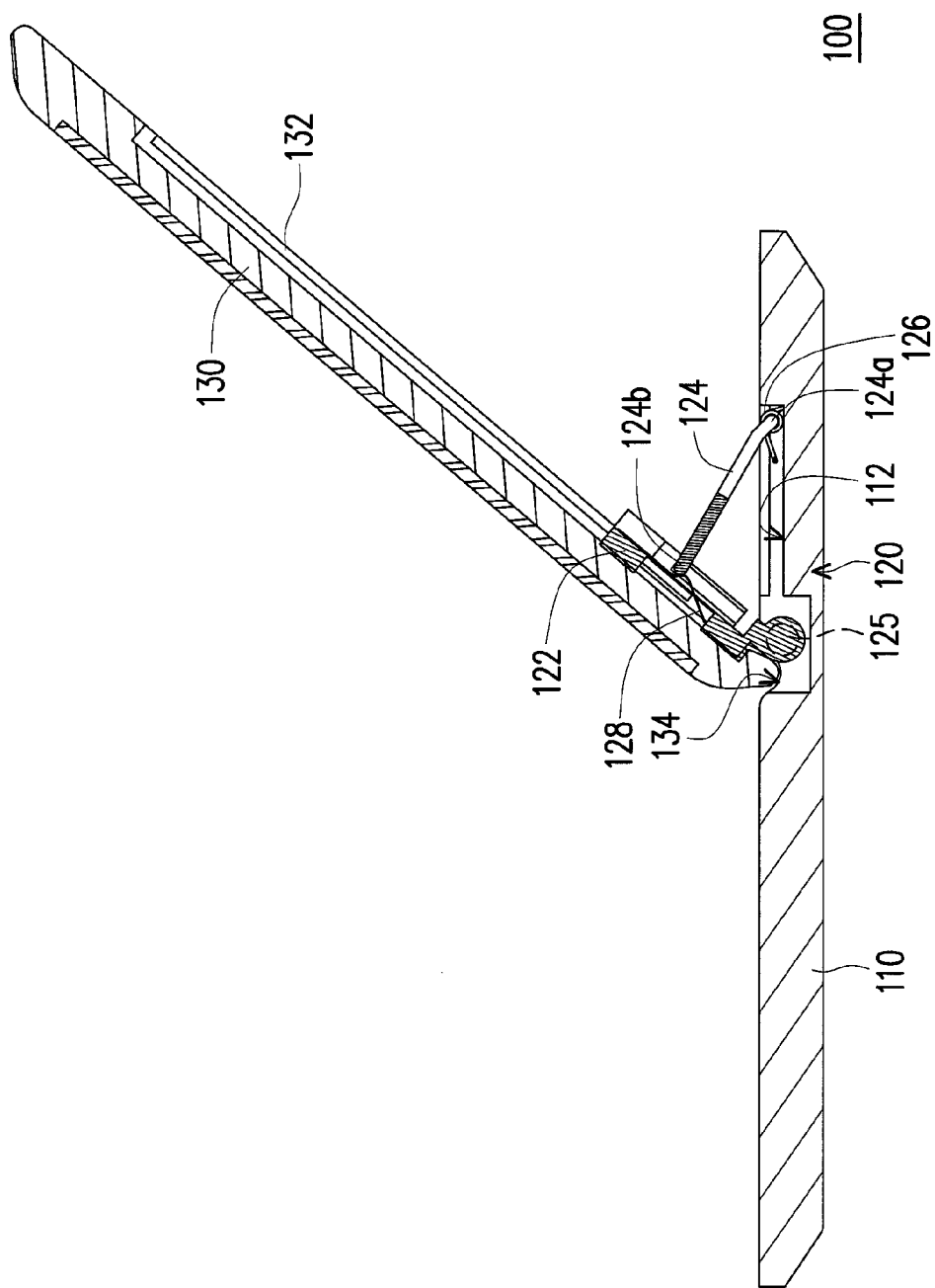

FIG. 1A to FIG. 1C illustrate a motion flow of an electronic device according to an embodiment of the invention. FIG. 2A to FIG. 2C are respectively cross-sectional views of FIG. 1A to FIG. 1C. Referring to FIG. 1A to FIG. 1C and FIG. 2A to FIG. 2C, the electronic device 100 of the present embodiment includes a first housing 110, at least one pivot structure 120 (two pivot structures are illustrated) and a second housing 130. The pivot structures 120 are connected between the first housing 110 and the second housing 130. The second housing 130 is adapted to be slid relative to the first housing 110 between a stacked position shown in FIG. 1A and FIG. 2A and an expanded position shown in FIG. 1B and FIG. 2B. When the second housing 130 is in the expended position relative to the first housing 110 as that shown in FIG. 1B and FIG. 2B, the second housing 130 can rotate to a tilt position shown in FIG. 1C and FIG. 2C relative to the first housing 110.

The second housing 130 of the present embodiment includes a touch interface for controlling a display on the second housing 130. The electronic device 100 of the present embodiment is, for example, a mobile phone or a flat panel computer, and the first housing 110 and the second housing 130 are, for example, respectively a host and a touch display or a docking and a flat panel computer, though the invention is not limited thereto. Along with different product designs, if the first housing 110 is a docking, it may further include an input device, which can be a keyboard. The second housing 130 generally includes a display and a touch area to facilitate a user to inspect and operate the second housing 130, where the touch area and the display area can be combined to form a touch display screen 130a. The user can perform a touch operation on the second housing 130 when the electronic device 100 is in a state as that shown in FIG. 1C and FIG. 2C. Composition and operation of the pivot structure 120 are described in detail below with reference of figures.

Figure 3:
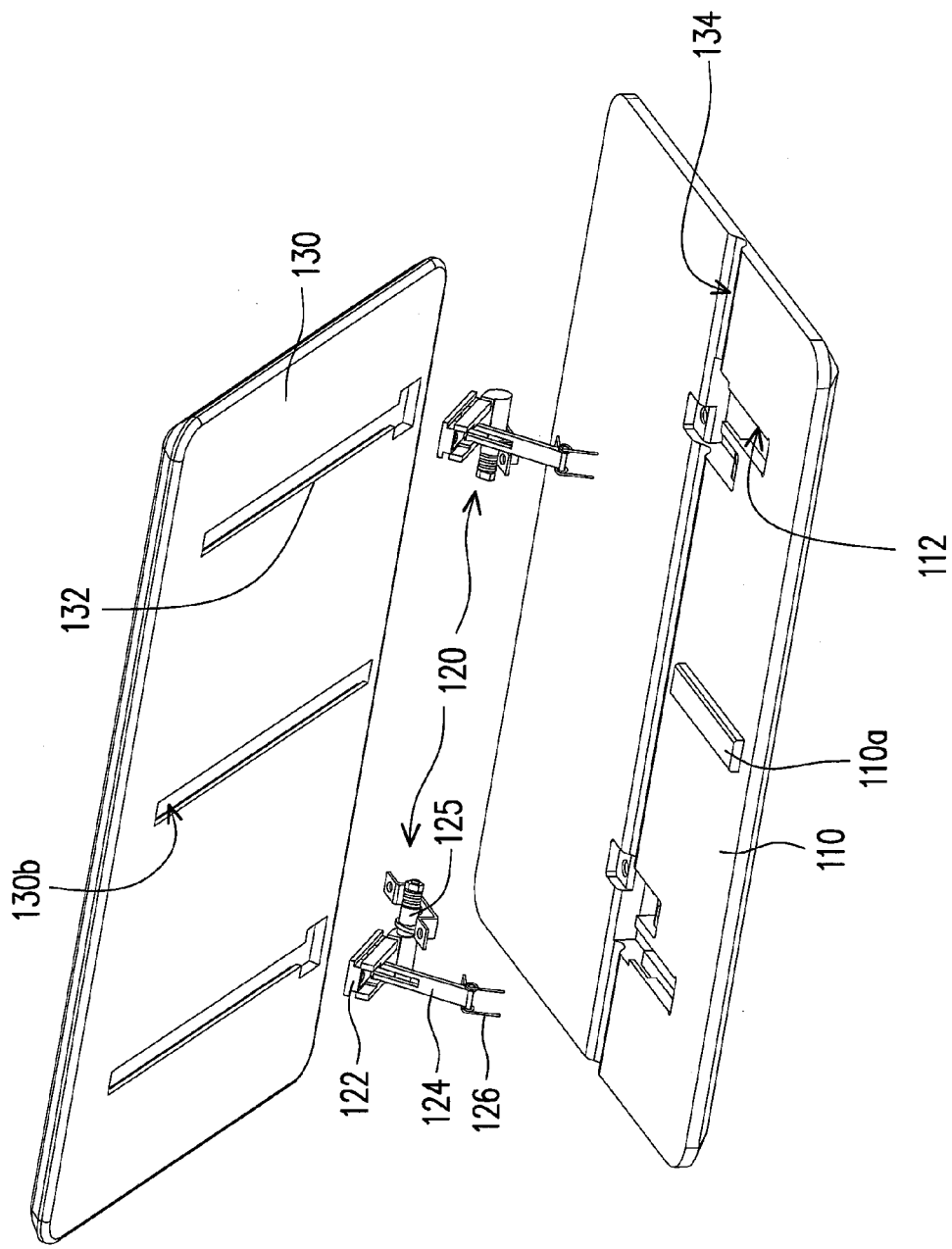
FIG. 3 is an exploded view of an electronic device of FIG. 1C.
Figure 4:
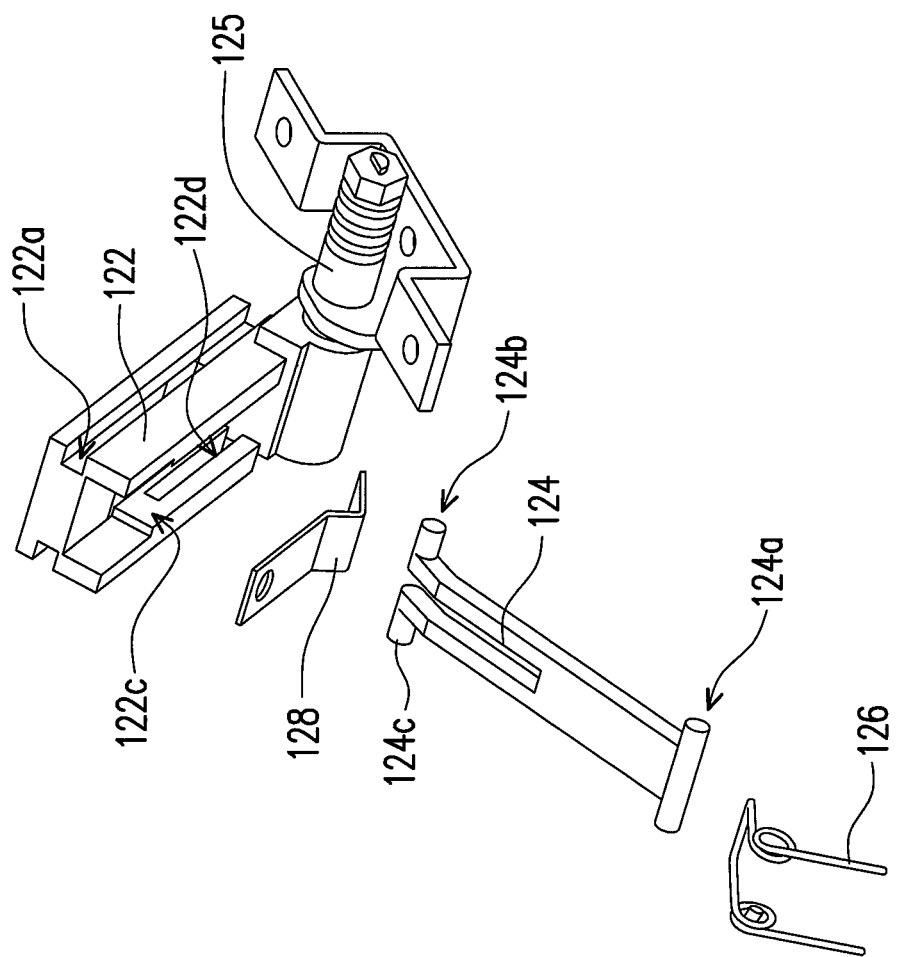
FIG. 4 is an exploded view of a part of components of a pivot structure of FIG. 3.

FIG. 3 is an exploded view of the electronic device of FIG. 1C. FIG. 4 is an exploded view of a part of components of the pivot structure of FIG. 3. Referring to FIG. 3 and FIG. 4, the pivot structure 120 of the present embodiment includes a sliding component 122 and a supporting component 124 and a pivot shaft 125. The pivot shaft 125 is pivoted on the first housing 110. The sliding component 122 is disposed on the second housing 130. One end of the sliding component 122 sleeves the pivot shaft 125, such that the second housing 130 is suitable for rotating relative to the first housing 110. The supporting component 124 has a first end 124a and a second end 124b. The first end 124a is pivoted to the first housing 110, such that the supporting component 124 is suitable for rotating relative to the first housing 110 from a state shown in FIG. 2B to a state shown in FIG. 1C to support the second housing 130.

The second housing 130 further includes a sliding portion 132, and the second housing 130 is slidably connected to the sliding component 122 through the sliding portion 132. When a guide slot 122a on a sidewall of the sliding component 122 slides in the sliding portion 132, the second housing 130 slides relative to the first housing 110 between a position shown in FIG. 1A and a position shown in FIG. 1B. Along with different product designs, the sliding portion 132 can be designed on the sliding component 122, while the guide slot 122a can be designed on the second housing 130, which is not limited by the invention. One end of the sliding portion 132 has a rotation position 134, and the rotation position 134 provides the sliding component 122 of the second housing 130 enough rotation space to rotate relative to the first housing 110. When the sliding component 122 is located at other positions of the sliding portion 132, the second housing 130 is position-limited by the first housing 110 and cannot be rotated relative to the first housing 110. When the second housing 130 slides relative to the first housing 110 such that the sliding component 122 is moved to the rotation position 134 of the sliding portion 132 and the second housing 130 sustains an external force to rotate through the sliding component 122, the second housing 130 can transmit the force to the sliding component 122 through the guide slot 122a combined to the sliding portion 132 to rotate one end of the sliding component 122. The sliding component 122 is suitable for pivotally rotating relative to the first housing 110 to drive the second housing 130 to be tilted to the first housing 110 as that shown in FIG. 1C and FIG. 2C. When the second housing 130 is tilted to the first housing 110, the second end 124b of the supporting component 124 is suitable for leaning against the sliding component 122 along with a pivot rotation of the first end 124a relative to the first housing 110 as that shown in FIG. 2C, such that the supporting component 124 is supported between the first housing 110 and the second housing 130 to stably support the rotated second housing 130. In this way, when the user presses the second housing 130 to perform a touch operation, swaying of the second housing 130 is mitigated due to the support of the supporting component 124.

Referring to FIG. 2A and FIG. 3, in detail, the first housing 110 has a slot 112. The first end 124a of the supporting component 124 is pivoted to the slot 112, and the supporting component 124 is limited by the second housing 130 and is contained in the slot 112. When the sliding component 122 is embedded in the slot 112 as that shown in FIG. 2A and FIG. 2B, the second housing 130 covers a part of the first housing 110 or slides relative to the first housing 110 through the sliding component 122. As shown in FIG. 1A and FIG. 2A, a width of the second housing 130 is smaller than a width of the first housing 110, and a main reason why the second housing 130 does not completely cover the first housing is to preserve a space of the first housing 110 to facilitate the user exerting a force on the second housing 130, such that the second housing 130 can smoothly slide relative to the first housing 110. When the sliding component 122 pivotally rotates relative to the first housing 110 and departs the slot 112, the second housing 130 is driven to be tilted to the first housing 110. Moreover, as shown in FIG. 4, the sliding component 122 has a groove 122c, the supporting component 124 is suitable for being embedded in the groove 122c, and is suitable for pivotally rotating relative to the sliding component 122 to depart from the groove 122c and support between the first housing 110 and the second housing 130. By embedding the supporting component 124 in the groove 122c, the supporting component 124 can be hidden without influencing a strength of the sliding component 122, so as to reduce a thickness of the electronic device 100. When the electronic device 100 is in the state as that shown in FIG. 1A or FIG. 1B, the slot 112 and the groove 122c respectively provide spaces for containing the sliding component 122 and the supporting component 124.

As shown in FIG. 4, the sliding component 122 has sliding slots 122d, and the second end 124b of the supporting component 124 has convex pillars 124c, where the sliding slots 122d are located on sidewalls of the groove 122c. The convex pillars 124c are suitable for sliding into the sliding slots 122d along with a pivot rotation of the first end 124a relative to the sliding component 122, such that the second end 124b can stably slide long the sliding component 122.

Referring to FIG. 3 and FIG. 4, the pivot structure 120 of the present embodiment further includes an elastic component 126, where the elastic component 126 is, for example, a torsion spring and is connected between the first housing 110 and the first end 124a of the supporting component 124. When the second housing 130 is tilted to the first housing 110, the supporting component 124 is suitable for pivotally rotating relative to the first housing 110 under an elastic force of the elastic component 126, and supports between the first housing 110 and the second housing 130 as that shown in FIG. 1C and FIG. 2C. In detail, when the electronic device 100 is in the state as that shown in FIG. 2A and FIG. 2B, the supporting component 124 is position-limited, and cannot be released from the groove 122c (indicated in FIG. 4), and now the elastic component 126 stores elastic potential energy. When the user adjusts the second housing 130 to be tilted to the first housing 110 through a process as that shown in FIG. 2A to FIG. 2C, the supporting component 124 is no longer position-limited, and is popped up to the position as that shown in FIG. 2C through the elastic force of the elastic component 126 to support the second housing 130.

Referring to FIG. 3, in the present embodiment, the first housing 110 has a position limiting component 110a, and the second housing 130 has a position limiting portion 130b. When the second housing 130 is rotated to a position as that shown in FIG. 1A and FIG. 2A and is stacked on the first housing 110, the position limiting component 110a and the position limiting portion 130b are interfered to fix a relative position of the first housing 110 and the second housing 130.

Figure 5:
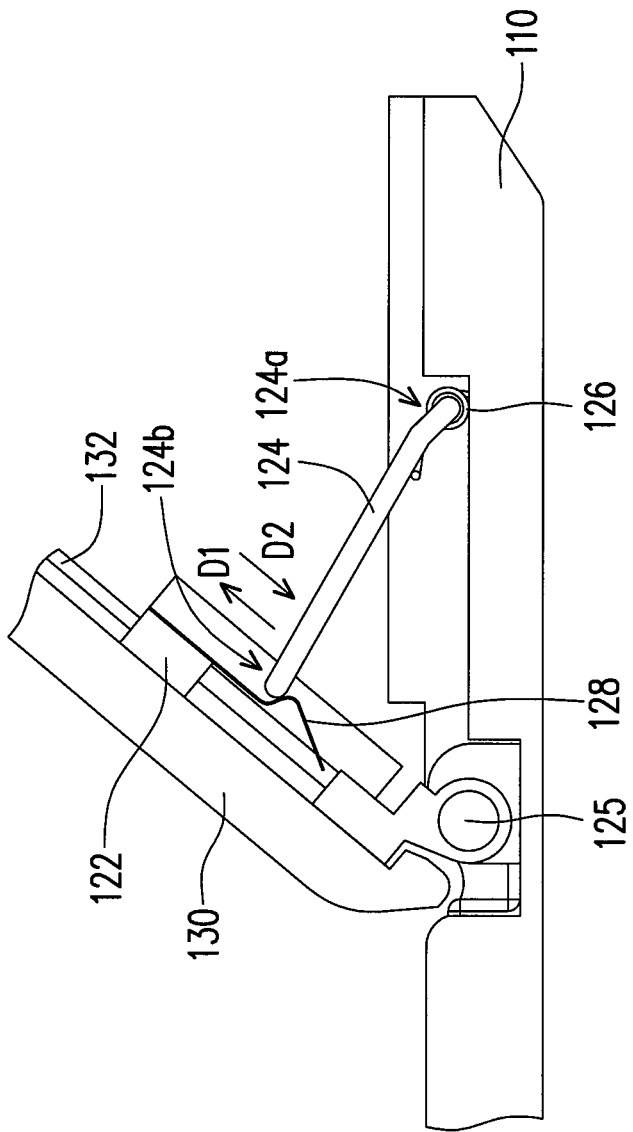
FIG. 5 is a partial cross-sectional view of the electronic device of FIG. 1C.

FIG. 5 is a partial cross-sectional view of the electronic device of FIG. 1C. Referring to FIG. 5, the pivot structure 120 of the present embodiment further includes an elastic stopper 128. The elastic stopper 128 is fixed on the sliding component 122 and is located on a moving path of the second end 124b along the sliding component 122, where the elastic stopper 128 can be a spring sheet or a leaf spring and a material thereof can be metal or plastic. When the supporting component 124 pivotally rotates relative to the first housing to drive the second end 124b to move relative to the first housing 110 along a direction D1 or a direction D2, the second end 124 resists an elastic force of the elastic stopper 128 and passes over the elastic stopper 128, so as to increase a user's hand feeling in operation. Moreover, the second end 124b is suitable for interfering the elastic stopper 128 for positioning the second end 124b at a location as that shown in FIG. 5.

In summary, the pivot structure of the invention has the supporting component pivoted to the first housing, and after the second housing rotates relative to the first housing, the supporting component can stably support the second housing. In this way, when a user presses the second housing to perform a touch operation, swaying of the second housing is mitigated due to the support of the supporting component, so that the electronic device has a better operability. Moreover, the elastic component can be disposed between the first housing and the supporting component, such that the supporting component can be automatically popped up from the sliding component through the elastic force of the elastic component, which facilitates the user's operation.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic device, comprising:
    a first housing;
    a second housing; and
    a pivot structure, comprising:
        a pivot shaft, pivoted to the first housing;
        a sliding component, disposed on the second housing, and having one end sleeving the pivot shaft, such that the second housing is suitable for rotating relative to the first housing; and
        a supporting component, having a first end and a second end, and the first end being pivoted to the first housing and suitable for rotating relative to the first housing, wherein when the second housing rotates relative to the first housing, the supporting component provides a supporting force to the second housing,
    wherein the second end of the supporting component is slidably disposed on the sliding component, the sliding component has an elastic stopper, and the second end and the elastic stopper are interfered for positioning the second end.

2. The electronic device as claimed in claim 1, wherein the second housing has a sliding portion, and the second housing is slidably connected to the sliding component through the sliding portion.

3. The electronic device as claimed in claim 2, wherein the second housing slides relative to the first housing between a stacked position and an expanded position.

4. The electronic device as claimed in claim 3, wherein only when the second housing is in the expanded position relative to the first housing, the second housing is capable of rotating to a tilt position relative to the first housing.

5. The electronic device as claimed in claim 1, wherein the first housing has a slot, the first end of the supporting component is pivoted to the slot, and the supporting component is limited by the second housing and is contained in the slot.

6. The electronic device as claimed in claim 1, wherein the pivot structure further comprises an elastic component, and the elastic component is connected to the first housing and the first end of the supporting component.

7. The electronic device as claimed in claim 1, wherein the first housing has a position limiting component, the second housing has a position limiting portion, and when the second housing is rotated to stack on the first housing, the position limiting component and the position limiting portion are interfered.

8. The electronic device as claimed in claim 1, wherein a width of the second housing is smaller than a width of the first housing.

* * * * *